HORACE C. WILCOX.

Improvement in Pickle Casters.

No. 4,820. Reissued March 19, 1872.

Witnesses

J. V. Shumway

A. J. Tibbits

Horace C. Wilcox
Inventor
By his Atty.
Thos. G. Earle

AM. PHOTO-LITHOGRAPHIC CO. N.Y. (OSBORNE'S PROCESS.)

UNITED STATES PATENT OFFICE.

HORACE C. WILCOX, OF WEST MERIDEN, CONNECTICUT, ASSIGNOR TO THE MERIDEN BRITANNIA COMPANY, OF SAME PLACE.

IMPROVEMENT IN PICKLE-CASTERS.

Specification forming part of Letters Patent No. 123,961, dated February 20, 1872; reissue No. 4,820, dated March 19, 1872.

*To all whom it may concern:*

Be it known that I, HORACE C. WILCOX, of West Meriden, in the county of New Haven and State of Connecticut, have invented a new Improvement in Pickle-Casters; and I do hereby declare the following, when taken in connection with the accompanying drawing and the letters of reference marked thereon, to be a full, clear, and exact description of the same, and which said drawing constitutes part of this specification and represents, in—

Figure 1:
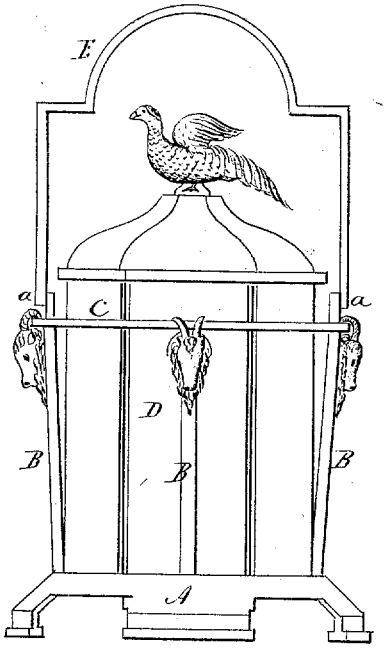
Figure 2:
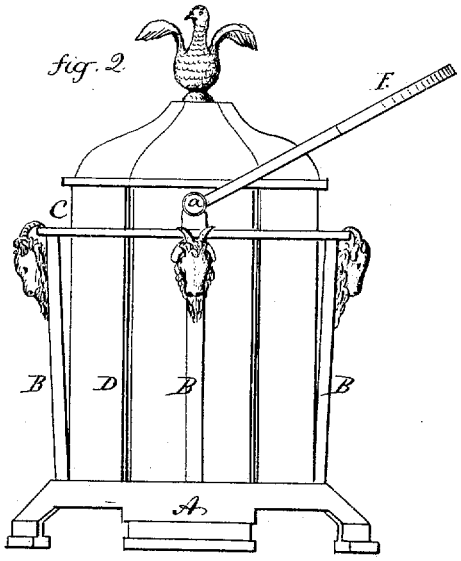

Figure 1, a front view; and in Fig. 2, a side view with the bail turned down.

This invention relates to an improvement in that class of bottle or table-casters commonly called "pickle-casters" from the use for which they are intended, with special reference to the use of a single bottle or jar, but applicable to jars having more than one bottle. In casters constructed with two bottles or jars the handle is usually stationary between the two, but in the use of a single jar or bottle the handle has been dispensed with or stationary handles fixed upon the sides, making it inconvenient to move the caster. The object of my invention is the attachment of a handle to pickle-casters which may be taken in hand above the bottle or jar, and when not required the handle will turn down out of the way; and it consists in the application of a hinged bail to the frame which surrounds the caster so as to turn up over and afford a convenience for lifting the caster, or turned down to allow free access to or removal of the jar.

I represent in the accompanying drawing a caster having a single jar, in which A is the base; B B, the posts; and C, an upper ring, forming together the frame or receptacle for the jar D. This frame may be of any form or design, according to the taste of the manufacturer or demands of the trade. E is a bail, pivoted to the frame at *a*, in design conforming to the other parts of the caster, and so as to turn up over the cover, as seen in Fig. 1, and form a convenient means for lifting the caster, or to be turned to the right or left, as seen in Fig. 2, to afford convenient access to the jar or for removal of the jar when desired. In casters having two bottles I prefer to pivot the bail, substantially as shown, adapting the construction of the bail to the frame so as to turn down in substantially in the same manner as for a single jar.

One great advantage of this construction is that the casters occupy considerably less height when the bail is turned down than the common stationary handle, and, consequently, in packing occupy considerably less space.

I claim as my invention—

A caster-frame having a handle, E, pivoted thereto, substantially as and for the purpose specified.

H. C. WILCOX.

Witnesses:
GEO. R. CURTIS,
C. C. FORKETT.